Oct. 5, 1965  R. E. KERCHOFF  3,210,519
WELDING APPARATUS AND ACTUATING ELEMENT
Filed June 6, 1963
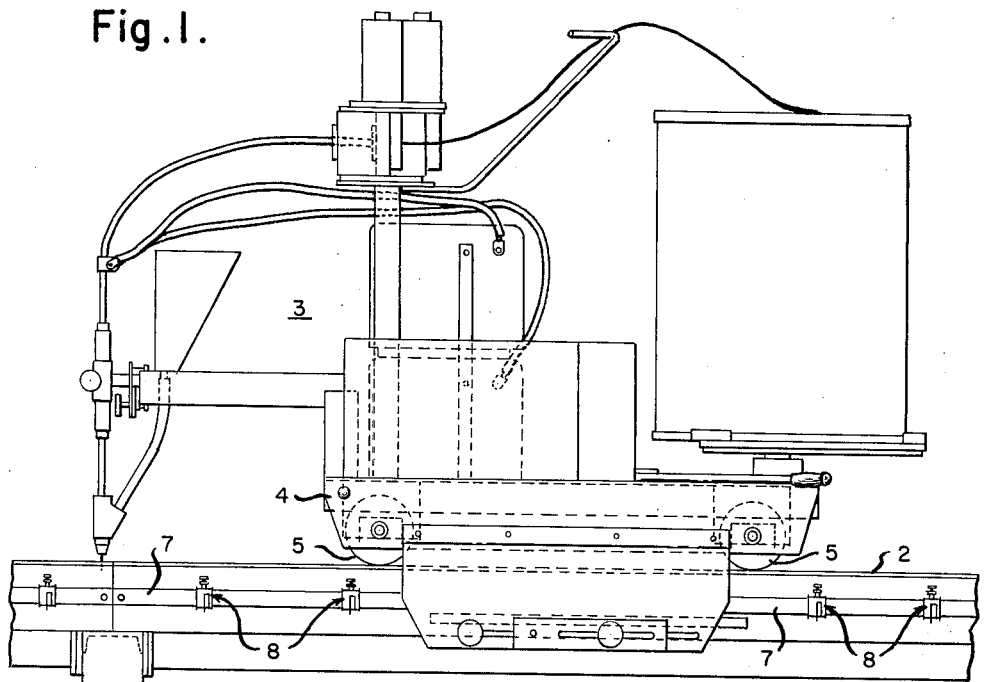
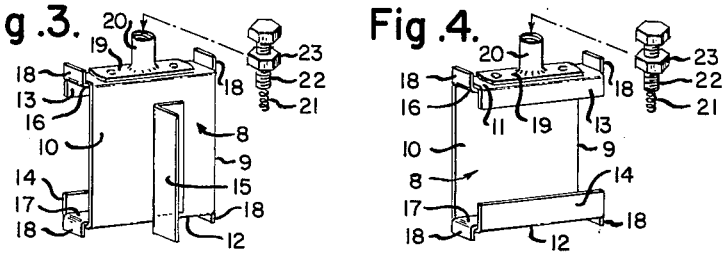
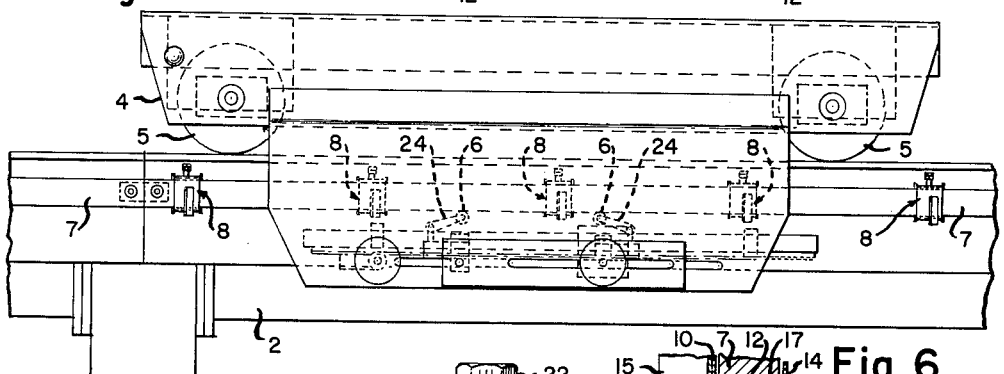
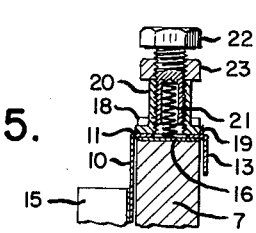
INVENTOR
Raymond E. Kerchoff
By
his Attorneys

United States Patent Office 3,210,519
Patented Oct. 5, 1965

3,210,519
WELDING APPARATUS AND ACTUATING ELEMENT
Raymond E. Kerchoff, New Berlin, Wis., assignor to Automatic Welding Company, Waukesha, Wis., a corporation of Wisconsin
Filed June 6, 1963, Ser. No. 286,051
8 Claims. (Cl. 219—125)

This invention relates to welding apparatus and to an actuating element adapted for use in welding apparatus but which also has other uses. The invention centers about an actuating element adapted to be applied to an elongated mounting member and to be moved along the elongated mounting member to a selected operative position where it performs a function such as actuating operating means movable relatively to the actuating element, as, for example, in welding apparatus. My actuating element is frictionally applied to the elongated mounting member by a frictional force of such magnitude that the actuating element may be moved along the elongated mounting member to adjusted operative position and yet without any further attention by the operator will remain in that position to perform its function, i.e., the reaction on the actuating element of the operating means engaging the actuating element will not cause the actuating element to move along the elongated mounting member. Preferably the magnitude of the frictional engagement between the actuating element and the elongated mounting member may be adjusted but once such adjustment is effected the operation may be carried out without further attention by the operator to the frictional engagement between the actuating element and the elongated mounting member.

For purposes of explanation and illustration I have shown the invention as embodied in welding apparatus of the type disclosed in copending applications Serial Nos. 249,832, now Patent No. 3,172,990 and 249,932, now Patent No. 3,182,177, filed January 7, 1963. In those applications there is disclosed welding apparatus comprising a work support, welding mechanism, means for relatively moving the work support and the welding mechanism to cause the welding mechanism to act successively on portions of work carried by the work support, an elongated mounting member on the work support extending in the direction of relative movement between the work support and the welding mechanism and a series of actuating elements mounted on and ranged along the elongated mounting member together with operating means mounted on the welding mechanism to be engaged by the actuating elements and pushed aside by the actuating elements upon relative movement between the work support and the welding mechanism controlling the welding function of the welding mechanism so that the welding mechanism acts on desired portions of work carried by the work support. The apparatus of said copending applications is designed specifically for the building up or refacing of the links of tracks used in equipment which travels on endless link tracks. In performing such an operation the welding must be discontinuous, i.e., a weld deposit is applied to each link of the track but the welding is stopped while the welding apparatus passes over the joints between links. The actuating elements are positioned along the elongated mounting member at the proper locations to cause the welding to stop and start where desired.

In the apparatus disclosed in said copending applications a group of the actuating elements is adapted to be pushed along the elongated mounting member from one end, actuating elements at the rear of the group being separated from the group one by one when they reach their respective operative positions. This positioning of the actuating elements may be accomplished by hand or by automatic or semi-automatic means. In any event according to said copending applications before the welding operation can be started it is necessary for the operator to fasten each actuating element in place on the elongated mounting member. This is time-consuming and adds to the cost of the operation, and also there is danger that the operator in tightening the actuating elements in place on the elongated mounting member after the actuating elements have been disposed in their proper operative positions may move such elements away from their proper positions.

I provide for frictionally engaging the actuating elements with the elongated mounting member or bar so that they may be moved to their respective operative positions as heretofore but need not be touched by the operator once they have assumed their proper operative positions. The frictional engagement between each actuating element and the bar assures maintaining the actuating element in its proper operative position against the force exerted on it by the operating means. To accomplish this result the frictional engagement between each actuating element and the bar must be great enough to withstand the force exerted thereon by the operating means and yet not great enough to prevent pushing of the actuating elements along the bar to position them at the beginning of the operation.

The actuating elements are slidable along the elongated mounting member to desired operative positions, each actuating element predeterminedly frictionally engaging the elongated mounting member permitting sliding the actuating element along the elongated mounting member to desired operative position but preventing movement of the actuating element along the elongated mounting member by engagement with the operating means upon relative movement between the work support and the welding mechanism. Each actuating element has means operable to determine at will the magnitude of its frictional engagement with the elongated mounting member. Each actuating element also preferably has means for holding the previously mentioned means in position to maintain a selected magnitude of such frictional engagement. Each actuating element may have means including spring means and means for altering the effectiveness of the spring means for accomplishing the function mentioned. Each actuating element may have portions engaging opposite faces of the elongated mounting member together with means for pressing such portions toward each other and hence toward the elongated mounting member with predetermined force.

I provide an actuating element for application to an elongated mounting member for slidable movement and frictional positioning on the elongated mounting member against movement along the elongated mounting member under the action of a predetermined force, the actuating element preferably comprising a body shaped to embrace and frictionally engage an elongated mounting member and means carried by the body for altering at will the magnitude of such frictional engagement. Means are preferably provided for holding the last mentioned means in selected positions. I preferably utilize spring means and means for altering the effectiveness of the spring means for altering at will the magnitude of the frictional engagement between the actuating element and the elongated mounting member. A friction shoe is preferably carried by the body mounted to engage the elongated mounting member, and means are preferably provided for pressing the friction shoe in a direction to increase the effectiveness of such engagement together with means for adjustably positioning the last mentioned means for selected determination of such effectiveness. Friction shoes are desirably carried by the body mounted to engage the elongated mounting member at opposite faces thereof with means for pressing at least one of the friction shoes in a direction to increase the effectiveness of such engagement together with means for adjustably positioning the last mentioned means for selective determination of such effectiveness. When friction shoes are employed they preferably extend generally parallel to the elongated mounting member and have their ends bent around the edges of the body of the actuating element away from the elongated mounting member. Spring means preferably press the friction shoe or shoes in a direction to increase the effectiveness of the engagement between the actuating element and the elongated mounting member. Also means are preferably provided for adjusting the magnitude of the spring pressure on the friction shoe or shoes.

A sleeve may be carried by the body outwardly of a friction shoe with a compression coil spring in the sleeve bearing against the friction shoe and urging the friction shoe in a direction toward the elongated mounting member. A screw may be threadedly connected with the sleeve and may bear against the outer end of the compression spring, the screw being adjustably positionable by reason of the threaded connection with the sleeve to alter at will the pressure of the spring on the friction shoe. In the present preferred form of my actuating element a friction shoe is carried by the body of the actuating element and mounted to engage the elongated mounting member, an internally threaded sleeve is carried by the body outwardly of the friction shoe, a compression coil spring is disposed in the sleeve to bear against the friction shoe and urge the friction shoe in a direction toward the elongated mounting member and a screw is threaded into the outer end of the sleeve bearing against the outer end of the compression coil spring adjustably positionable by reason of the threaded connection between the screw and the sleeve to alter at will the pressure of the spring on the friction shoe. A lock nut is preferably applied to the screw and adapted to be tightened against the outer end of the sleeve to fixedly position the screw in selected positions.

Other details, objects and advantages of the invention will become apparent as the following description of a present preferred embodiment thereof proceeds.

In the accompanying drawings I have shown a present preferred embodiment of the invention in which—

FIGURE 1 is a partial side elevational view of welding apparatus;

FIGURE 2 is a side elevational view of a portion of the welding apparatus shown in FIGURE 1 to enlarged scale;

FIGURE 3 is an isometric elevational view to enlarged scale of an actuating element constructed in accordance with my invention;

FIGURE 4 is an isometric elevational view of the actuating element shown in FIGURE 3 but as viewed from the opposite side;

FIGURE 5 is a fragmentary detail transverse cross-sectional view to further enlarged scale through the upper portion of the bar and actuating element; and FIGURE 6 is a fragmentary detail transverse cross-sectional view through the lower portion of the bar and actuating element and showing the rollers operatively associated therewith.

Referring now more particularly to the drawings, FIGURE 1 shows an elongated work support designated generally by reference numeral 2 which is of generally pan shape in cross section as disclosed in said copending applications and is adapted to contain work such as a link track whose links are to be built up or refaced by weld deposits. Welding mechanism designated generally by reference numeral 3 is mounted on a carriage 4 movable on wheels 5 along the work support 2. The detailed structure of the welding mechanism does not constitute a limitation upon the present invention and the welding mechanism may be of any suitable type as well known to those skilled in the art. As the welding mechanism 3 moves along the work support 2 the links of the track disposed upon the work support are built up or refaced by weld metal deposited thereon. To accomplish this result the welding must be discontinuous, i.e., weld deposits are applied to the links but welding is stopped while the welding mechanism traverses the connections between links.

The welding mechanism is controlled by operating means shown more clearly in FIGURE 2. The operating means comprise rollers 6 carried by arms 24 forming portions of the weld control and which through suitable relays and other electrical connections well known to those skilled in the art start and stop the welding when actuated.

Mounted on the work support 2 is an elongated mounting member or bar 7. Mounted on the bar 7 are a plurality of actuating elements 8. One of the actuating elements 8 is shown in detail and to enlarged scale in FIGURES 3 and 4. It comprises a body 9 shaped to embrace the bar 7, having an upright portion 10, a top horizontal portion 11 and a bottom horizontal portion 12. The top horizontal portion 11 terminates in a downturned flange 13. The bottom horizontal portion terminates in an upturned flange 14. Connected with the portion 10 and extending laterally and downwardly therefrom is an ear 15 which serves as a detent and is the operative portion of the actuating element 8.

Disposed within the actuating element 8 at its top and bottom so as to frictionally engage the top and bottom of the bar 7 are upper and lower friction shoes 16 and 17 respectively. Each of the friction shoes 16 and 17 extends generally parallel to the bar 7 and has its ends 18 bent around the edges of the body away from the bar. Mounted on the upper horizontal portion 11 of the actuating element 8 is a bracket 19 carrying a cylindrical sleeve 20 which is open at both ends, the bracket 19 and the portion 11 of the actuating element 8 having a bore therethrough communicating with the bore of the sleeve 20. The sleeve 20 is internally threaded. A compression coil spring 21 is disposed within the sleeve 20 with its inner end extending through the bore 19 and the portion 11 of the actuating element 9 and bearing against the upper friction shoe 16 to press that friction shoe against the bar 7. A screw 22 is threaded into sleeve 20, the inner end of the screw 22 being hollow and receiving the outer end of the spring 21. As the screw 22 is screwed into the internally threaded sleeve 20 the spring 21 is compressed, and the more the spring is compressed the greater is the pressure which it exerts against the friction shoe 16 pressing that friction shoe against the top of the bar 7 and also of course drawing the friction shoe 17 tightly against the bottom of the bar. A lock nut 23 is provided on the screw 22, the lock nut being adapted to be turned up against the outer end of the sleeve 20 to lock the screw 22 in any desired adjusted position.

The rollers 6 are, as above stated, carried by arms 24. The arms 24 are spring pressed upwardly so that the rollers 6 normally roll along the under surface of the bar 7. Each roller 6 is rotatably mounted on axle 25 which has a laterally projecting portion carrying a roller 6a. The rollers 6a may be integral with the respective rollers 6 or separate therefrom as disclosed in said copending applications, depending on the structure of the particular apparatus of which the rollers are a part. In the drawings the rollers 6a are shown separate from the rollers 6. The rollers 6a are disposed in the path of the portions of the detents 15 which project below the bottom of the bar 7. As the welding apparatus moves along the work support the rollers 6a engage the detents 15 and are depressed or pushed aside by the detents 15, this being permitted by the spring mounting of the arms 24. Each roller 6a naturally exerts some force against each detent 15 tending to move the actuating element 8 of which the detent is a part along the bar 7. Each screw 22 is adjusted so that the pressure of the spring 21 on the friction shoe 16 is sufficient to prevent the rollers 6a from moving the actuating elements 8 along the bar 7, yet the actuating elements 8 may be pushed along the bar when being initially set in their operative positions without changing the spring pressure. The actuating elements may be repositioned repeatedly for different jobs without the necessity of any adjustment of the springs. This provision for frictionally mounting the actuating elements on the elongated mounting member with sufficient friction to prevent movement of the actuating elements along the elongated operating member by the welding mechanism but still permitting pushing of the actuating elements along the elongated mounting member in setting up the job results in an important saving in time and labor and assurance of accurate results since the danger of the operator unintentionally moving the actuating elements along the elongated mounting member when tightening the actuating elements to the elongated mounting member is eliminated.

While I have shown and described a present preferred embodiment of the invention it is to be distinctly understood that the invention is not limited thereto but may be otherwise variously embodied within the scope of the following claims.

I claim:

1. Welding apparatus comprising a work support, welding mechanism, means for relatively moving the work support and the welding mechanism to cause the welding mechanism to act successively on portions of work carried by the work support, an elongated mounting member on the work support extending in the direction of relative movement between the work support and the welding mechanism, a series of actuating elements mounted on and ranged along the elongated mounting member and operating means mounted on the welding mechanism to be engaged by the actuating elements and pushed aside by the actuating elements upon relative movement between the work support and the welding mechanism controlling the welding function of the welding mechanism so that the welding mechanism acts on desired portions of work carried by the work support, the actuating elements being slidable along the elongated mounting member to desired operative positions, each actuating element predeterminedly frictionally engaging the elongated mounting member with a controlled grip whereby to permit sliding the actuating element along the elongated mounting member to desired operative position but prevent movement of the actuating element along the elongated mounting member by engagement with the operating means upon relative movement between the work support and the welding mechanism.

2. Welding apparatus comprising a work support, welding mechanism, means for relatively moving the work support and the welding mechanism to cause the welding mechanism to act successively on portions of work carried by the work support, an elongated mounting member on the work support extending in the direction of relative movement between the work support and the welding mechanism, a series of actuating elements mounted on and ranged along the elongated mounting member and operating means mounted on the welding mechanism to be engaged by the actuating elements and pushed aside by the actuating elements upon relative movement between the work support and the welding mechanism controlling the welding function of the welding mechanism so that the welding mechanism acts on desired portions of work carried by the work support, the actuating elements being slidable along the elongated mounting member to desired operative positions, each actuating element having generally planar portions lying flat against the elongated mounting member at opposite faces thereof to embrace the elongated mounting member and frictionally engaging the elongated mounting member permitting sliding the actuating element along the elongated mounting member to desired operative position and having means operable to determine at will the magnitude of such frictional engagement with the elongated mounting member to prevent movement of the actuating element along the elongated mounting member by engagement with the operating means upon relative movement between the work support and the welding mechanism.

3. Welding apparatus comprising a work support, welding mechanism, means for relatively moving the work support and the welding mechanism to cause the welding mechanism to act successively on portions of work carried by the work support, an elongated mounting member on the work support extending in the direction of relative movement between the work support and the welding mechanism, a series of actuating elements mounted on and ranged along the elongated mounting member and operating means mounted on the welding mechanism to be engaged by the actuating elements and pushed aside by the actuating elements upon relative movement between the work support and the welding mechanism controlling the welding function of the welding mechanism so that the welding mechanism acts on desired portions of work carried by the work support, the actuating elements being slidable along the elongated mounting member to desired operative positions, each actuating element having generally planar portions lying flat against the elongated mounting member at opposite faces thereof to embrace the elongated mounting member and frictionally engaging the elongated mounting member permitting sliding the actuating element along the elongated mounting member to desired operative position and having means including spring means and means for altering the effectiveness of the spring means operable to determine at will the magnitude of such frictional engagement with the elongated mounting member to prevent movement of the actuating element along the elongated mounting member by engagement with the operating means upon relative movement between the work support and the welding mechanism.

4. Welding apparatus comprising a work support, welding mechanism, means for relatively moving the work support and the welding mechanism to cause the welding mechanism to act successively on portions of work carried by the work support, an elongated mounting member on the work support extending in the direction of relative movement between the work support and the welding mechanism, a series of actuating elements mounted on and ranged along the elongated mounting member and operating means mounted on the welding mechanism to be engaged by the actuating elements and pushed aside by the actuating elements upon relative movement between the work support and the welding mechanism controlling the welding function of the welding mechanism so that the welding mechanism acts on desired portions of work carried by the work support, the actuating elements being slidable along the elongated mounting member to desired operative positions, each actuating element frictionally engaging the elongated mounting member permitting sliding the actuating element along the elongated mounting member to desired operative position and having portions engaging opposite faces of the elongated mounting member, at least one of such portions being separate from the actuating element proper, and means for pressing such separate portion toward the opposed portion and hence toward the elongated mounting member with predetermined force to prevent movement of the actuating element along the elongated mounting member by engagement with the operating means upon relative movement between the work support and the welding mechanism.

5. An actuating element for application to an elongated mounting member for slidable movement and frictional positioning on the elongated mounting member against movement along the elongated mounting member under the action of a predetermined force, the actuating element comprising a body shaped to embrace an elongated mounting member, a friction shoe carried by the body mounted to engage the elongated mounting member, a sleeve carried by the body outwardly of the friction shoe, a compression coil spring in the sleeve bearing against the friction shoe and urging the friction shoe in a direction toward the elongated mounting member and means for altering at will the pressure of the spring on the friction shoe.

6. An actuating element for application to an elongated mounting member for slidable movement and frictional positioning on the elongated mounting member against movement along the elongated mounting member under the action of a predetermined force, the actuating element comprising a body shaped to embrace an elongated mounting member, a friction shoe carried by the body mounted to engage the elongated mounting member, a sleeve carried by the body outwardly of the friction shoe, a compression coil spring in the sleeve bearing against the friction shoe and urging the friction shoe in a direction toward the elongated mounting member and a screw threadedly connected with the sleeve and bearing against the outer end of the compression spring adjustably positionable by reason of the threaded connection with the sleeve to alter at will the pressure of the spring on the friction shoe.

7. An actuating element for application to an elongated mounting member for slidable movement and frictional positioning on the elongated mounting member against movement along the elongated mounting member under the action of a predetermined force, the actuating element comprising a body shaped to embrace an elongated mounting member, a friction shoe carried by the body mounted to engage the elongated mounting member, an internally threaded sleeve carried by the body outwardly of the friction shoe, a compression coil spring in the sleeve bearing against the friction shoe and urging the friction shoe in a direction toward the elongated mounting member, a screw threaded into the outer end of the sleeve bearing against the outer end of the compression coil spring adjustably positionable by reason of the threaded connection between the screw and the sleeve to alter at will the pressure of the spring on the friction shoe and a lock nut applied to the screw and adapted to be tightened against the outer end of the sleeve to fixedly position the screw in selected positions.

8. An actuating element for application to an elongated mounting member for slidable movement and frictional positioning on the elongated mounting member against movement along the elongated mounting member under the action of a predetermined force, the actuating element comprising a body shaped to embrace an elongated mounting member, a friction shoe carried by the body mounted to engage the elongated mounting member, the friction shoe extending generally parallel to the elongated mounting member and having its ends bent around the edges of the body away from the elongated mounting member, and means for pressing the friction shoe in a direction toward the elongated mounting member.

References Cited by the Examiner
UNITED STATES PATENTS

| | | | |
|---|---|---|---|
| 1,009,668 | 11/11 | Jass | 74—503 |
| 1,454,238 | 5/23 | Kaufman | 188—67 X |
| 1,765,340 | 6/30 | Landsiedel | 74—568 |
| 1,846,537 | 2/32 | Withrow | 188—42 |
| 2,723,776 | 11/55 | Jacobson | 188—67 |
| 3,109,921 | 11/63 | Anderson | 219—125 |
| 3,114,032 | 12/63 | Leader et al. | 219—125 |

ANTHONY BARTIS, *Acting Primary Examiner.*

JOSEPH V. TRUHE, *Examiner.*